(12) United States Patent
Beyerlein et al.

(10) Patent No.: US 11,970,216 B2
(45) Date of Patent: Apr. 30, 2024

(54) WORM GEAR HUB

(71) Applicant: Steering Solutions IP Holding Corporation, Saginaw, MI (US)

(72) Inventors: Jeffrey E. Beyerlein, Frankenmuth, MI (US); Alan G. Turek, Mayville, MI (US); Jesse A. Heather, Swartz Creek, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 0 days.

(21) Appl. No.: 17/715,657

(22) Filed: Apr. 7, 2022

(65) Prior Publication Data

US 2022/0227411 A1   Jul. 21, 2022

Related U.S. Application Data

(60) Division of application No. 15/799,551, filed on Oct. 31, 2017, now abandoned, which is a division of
(Continued)

(51) Int. Cl.
| | |
|---|---|
| *B62D 3/04* | (2006.01) |
| *B21K 1/30* | (2006.01) |
| *B23P 15/14* | (2006.01) |
| *B29C 70/74* | (2006.01) |
| *B62D 5/04* | (2006.01) |
| *F16H 55/06* | (2006.01) |
| *F16H 55/17* | (2006.01) |
| *F16H 55/22* | (2006.01) |
| *B29C 65/00* | (2006.01) |

(Continued)

(52) U.S. Cl.
CPC ............ *B62D 3/04* (2013.01); *B23P 15/14* (2013.01); *B29C 70/74* (2013.01); *B62D 5/0409* (2013.01); *F16H 55/06* (2013.01); *F16H 55/17* (2013.01); *F16H 55/22* (2013.01); *B21K 1/30* (2013.01); *B29C 65/44* (2013.01); *B29C 66/0344* (2013.01); *B29C 66/74283* (2013.01); *B29K 2305/12* (2013.01); *B29L 2015/003* (2013.01); *F16H 2055/065* (2013.01); *Y10T 29/49469* (2015.01); *Y10T 74/1987* (2015.01)

(58) Field of Classification Search
CPC .......... B62D 3/04; B62D 5/0409; B21K 1/30; B29C 70/74; B29C 70/76; F16H 2055/065
See application file for complete search history.

(56) References Cited

U.S. PATENT DOCUMENTS

| | | | | |
|---|---|---|---|---|
| 1,771,370 | A | * | 7/1930 | Benge .................... F16H 55/48 74/449 |
| 2010/0101889 | A1 | * | 4/2010 | Yamaguchi ............ H02K 11/33 180/444 |
| 2010/0320025 | A1 | * | 12/2010 | Beyerlein ............... F16H 55/22 74/411 |

FOREIGN PATENT DOCUMENTS

WO   WO-2008000220 A2 *  1/2008  ............ F16H 55/06

OTHER PUBLICATIONS

Machine translation of WO-2008000220-A2 (Year: 2008).*

* cited by examiner

*Primary Examiner* — Kyle A Cook
(74) *Attorney, Agent, or Firm* — Dickinson Wright PLLC

(57) ABSTRACT

A method of making a worm gear. The method includes forming a gear blank having a plurality of individual lugs formed about an outer circumferential edge of said blank to facilitate a uniform flow of a material around said plurality of individual lugs. The method also includes molding said material around said plurality of individual lugs to form a ring.

7 Claims, 9 Drawing Sheets

Related U.S. Application Data application No. 14/449,737, filed on Aug. 1, 2014, now Pat. No. 9,868,459, which is a continuation-in-part of application No. 12/818,675, filed on Jun. 18, 2010, now abandoned.

(60) Provisional application No. 61/218,801, filed on Jun. 19, 2009.

(51) Int. Cl.
*B29C 65/44* (2006.01)
*B29K 305/12* (2006.01)
*B29L 15/00* (2006.01)

WORM GEAR HUB

CROSS-REFERENCES TO RELATED APPLICATIONS

This patent application is a divisional application of, and claims priority to, U.S. patent application Ser. No. 15/799,551, filed Oct. 31, 2017, which is a divisional of, and claims priority to, U.S. patent application Ser. No. 14/449,737, filed Aug. 1, 2014, now U.S. Pat. No. 9,868,459, issued Jan. 16, 2018, which is a continuation-in-part of, and claims priority to, U.S. patent application Ser. No. 12/818,675, filed Jun. 18, 2010, which claims priority to U.S. Provisional Patent Application Ser. No. 61/218,801, filed Jun. 19, 2009, the disclosure of each above-referenced application incorporated herein by reference in their respective entirety.

FIELD OF THE INVENTION

The subject invention relates to a worm gear hub and more particularly a worm gear hub assembly suitable for use in electric power steering units and systems.

BACKGROUND

In an Electric Power Steering (EPS) unit an electric motor drives a worm shaft and worm gear to provide assist torque to the turning of a steering shaft. This reduces the effort required to steer a vehicle. Currently worm gears used in these systems have been made using a solid steel puck. Each puck is then machined with a knurl on the perimeter. The puck then is the base or hub of the worm gear assembly.

The knurled surface is bead blasted to prep for a silane solution treatment that prepares the metal for bonding. A ring of plastic, made by a spin cast method, is placed on the metal. After the plastic is pressed on, the worm gear assembly is heated to cause the plastic to melt into the knurl surface of the hub and bond to the steel. This is followed by an annealing cycle to stress relieve the plastic. The hub assembly is pressed onto a shaft and teeth are hobbed (or cut) into the plastic ring to complete the gear assembly. As use in an electric power steering application or other application, the knurl to plastic bond transfers assist torque from the worm shaft, through the worm gear assembly, to the steering shaft. The process of making one gear hub assembly can be found in U.S. Pat. No. 6,638,390.

Machining of gear hubs to create the knurled surface with which to bond the plastic is expensive, as are powdered metal hubs.

Accordingly, it is desirable to provide a worm gear hub and worm gear hub assembly capable of transferring torque between a worm shaft and a steering shaft without the prior disadvantages.

SUMMARY OF THE INVENTION

According to one exemplary embodiment of the disclosure, an electric power steering system includes a steering shaft connected to a handwheel at one end and a rack and pinion steering mechanism at an opposite end. Also included is a steering assist unit comprising an electric motor operated by a controller and driving a worm and a worm gear interposed between said worm and said steering shaft, said worm having worm teeth and said worm gear fitted on said steering shaft. The worm gear also includes a disk having a first face axially disposed opposite a second face. Also included is a first plurality of individual lugs formed on said first face circumferentially adjacent an outer circumferential edge of said disk, wherein each lug of said first plurality of individual lugs having a first inner circumferential edge formed on said first face along a first retaining diameter, said first retaining diameter generally less than a disk diameter, circumferentially adjacent lugs of said first plurality of individual lugs having a first circumferential spacing therebetween. Further included is a ring overlaying a portion of said disk including said first plurality of individual lugs, said ring having an outer diameter, said outer diameter generally greater than said disk diameter. Yet further included is a plurality of gear teeth on an outer edge surface of said ring for meshing with said worm teeth.

In another exemplary embodiment of the disclosure, a method of making a worm gear is provided. The method includes forming a gear blank having a plurality of individual lugs formed about an outer circumferential edge of said blank to facilitate a uniform flow of a material around said plurality of individual lugs. The method also includes molding said material around said plurality of individual lugs to form a ring.

The above features and advantages and other features and advantages of the present invention are readily apparent from the following detailed description of the invention when taken in connection with the accompanying drawings.

BRIEF DESCRIPTION OF THE DRAWINGS

Other objects, features, advantages and details appear, by way of example only, in the following detailed description of embodiments, the detailed description referring to the drawings in which.

DESCRIPTION OF THE EMBODIMENTS

Figure 1:
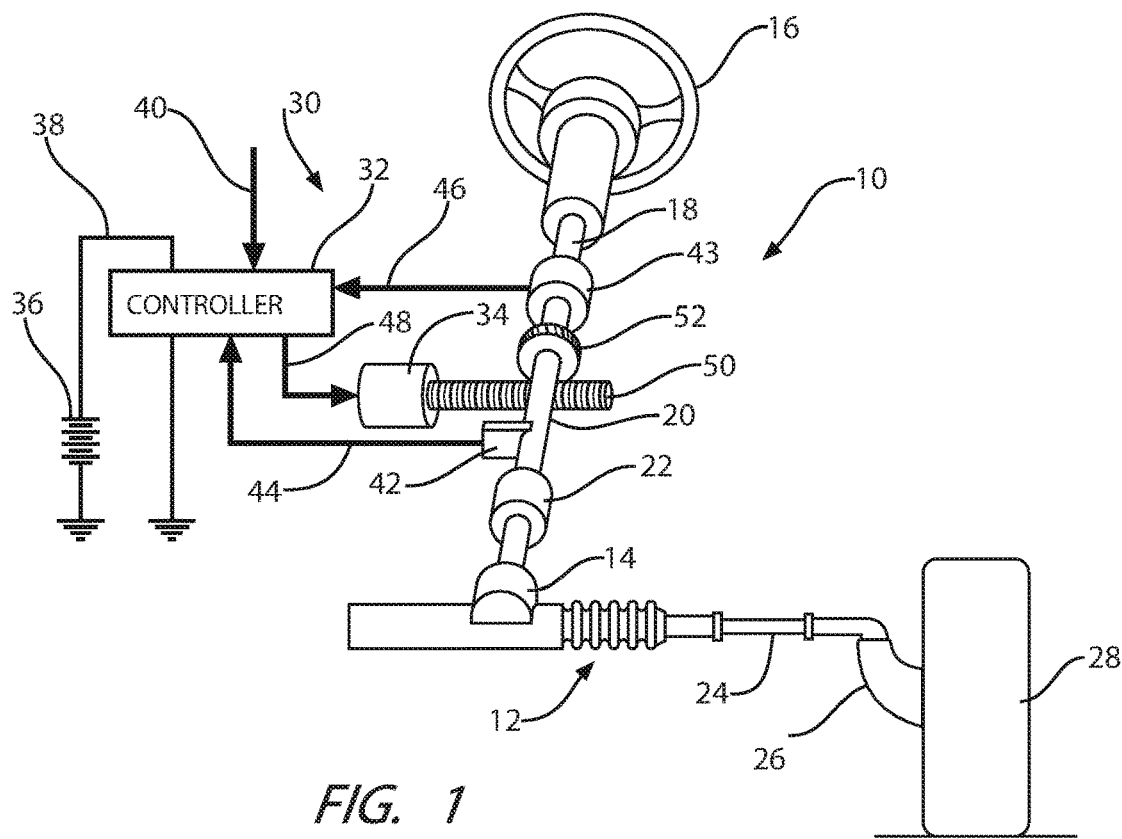
FIG. 1 is a schematic diagram of a power steering system in accordance with the invention.

Referring now to the Figures, where the invention will be described with reference to specific embodiments without limiting same, and in accordance with exemplary embodiments of the present invention, FIG. 1 shows an electric power steering (EPS) system 10 for a motor vehicle. The EPS system 10 includes a rack-and-pinion type steering mechanism 12 that is comprised of a toothed rack (not shown) and a pinion gear (not shown) located under a gear housing 14. A steering wheel 16 is coupled to an upper steering shaft 18. As the steering wheel 16 is turned, the upper steering shaft 18, which is connected to a lower steering shaft 20 through a universal joint 22, turns the pinion gear. Rotation of the pinion gear moves the toothed rack, which moves tie rods 24 (only one shown) that, in turn, move steering knuckles 26 (only one shown), which turn wheels 28 (only one shown).

EPS assist torque is provided through a steering assist unit 30, which includes a controller 32 and an electric motor 34. The controller 32 is powered by a vehicle power supply 36 through a supply line 38. The controller 32 receives a signal indicative of the vehicle velocity on a signal line 40. Steering pinion gear angle is measured by a position sensor 42 and fed to the controller 32 through a line 44. As the steering wheel 16 is turned, a torque sensor 43 senses the torque applied to the steering wheel 16 by a vehicle operator. The torque sensor 43 may include a torsion bar (not shown) and a variable-resistance type of sensor (not shown) that outputs a variable resistance signal to the controller 32 through a line 46 in relation to the amount of twist on the torsion bar.

In response to the inputs on lines 40, 44 and 46, the controller 32 sends a command signal through a line 48 to the electric motor 34. The motor 34, in turn, supplies an assist torque to the steering system 10 through a worm 50 and a worm gear 52, in order to provide a steering torque assist to the steering system 10 that supplements the steering force exerted by a vehicle operator.

Figure 2:
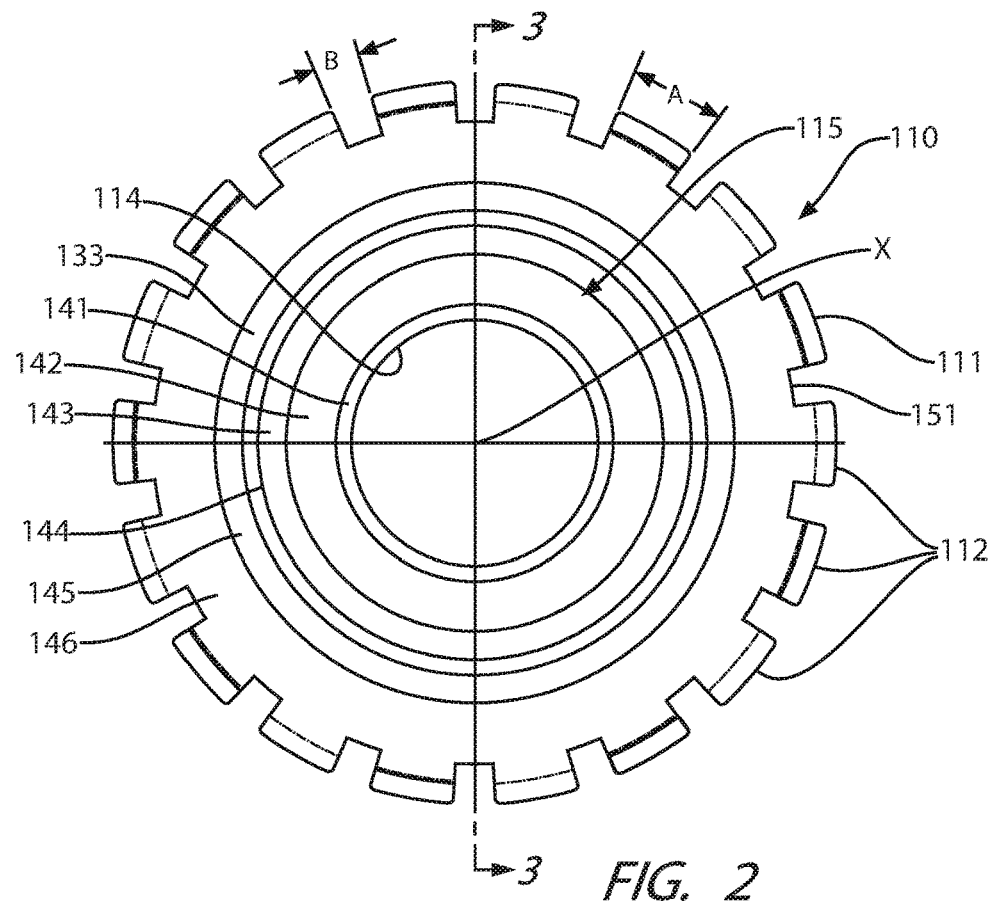
FIG. 2 is an elevation view of a gear hub blank in accordance with the invention.
Figure 3:
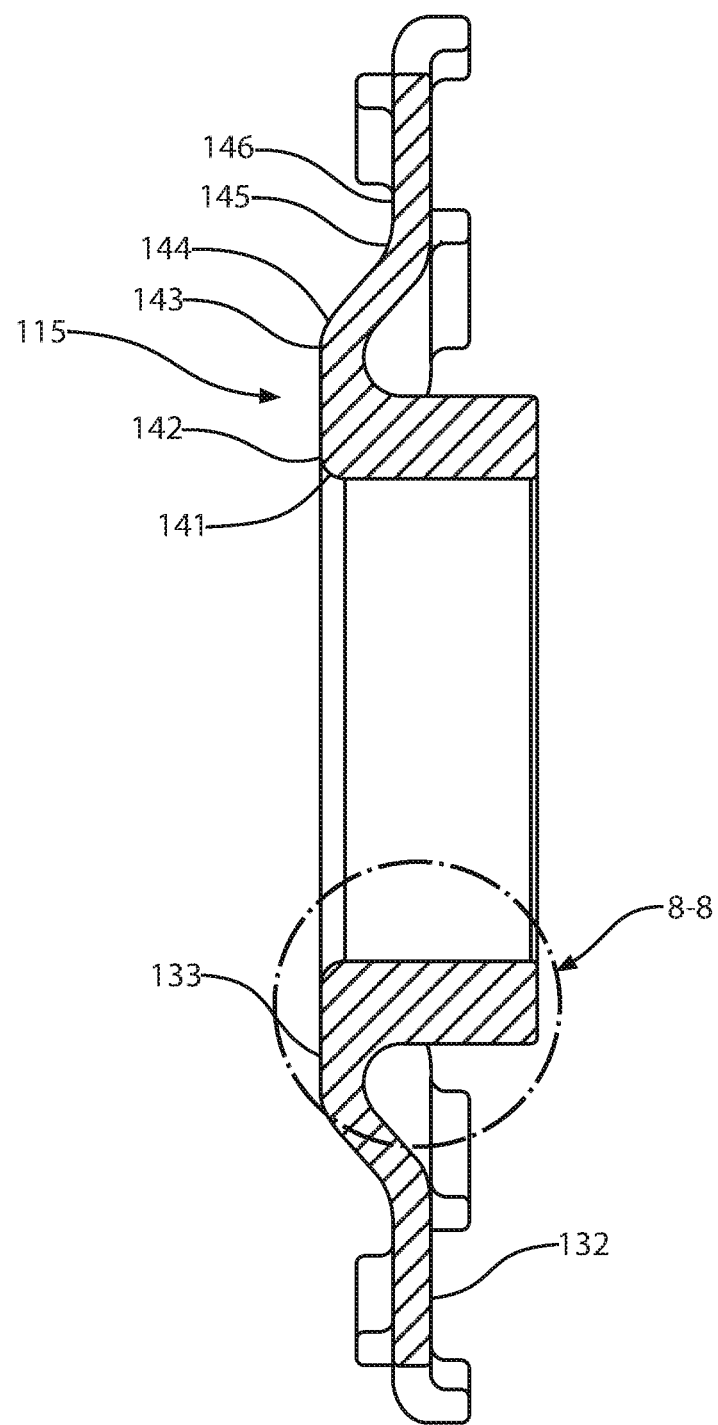
FIG. 3 is a cross-sectional view of the gear hub blank of FIG. 2, taken along line 3-3 of FIG. 2.
Figure 8:
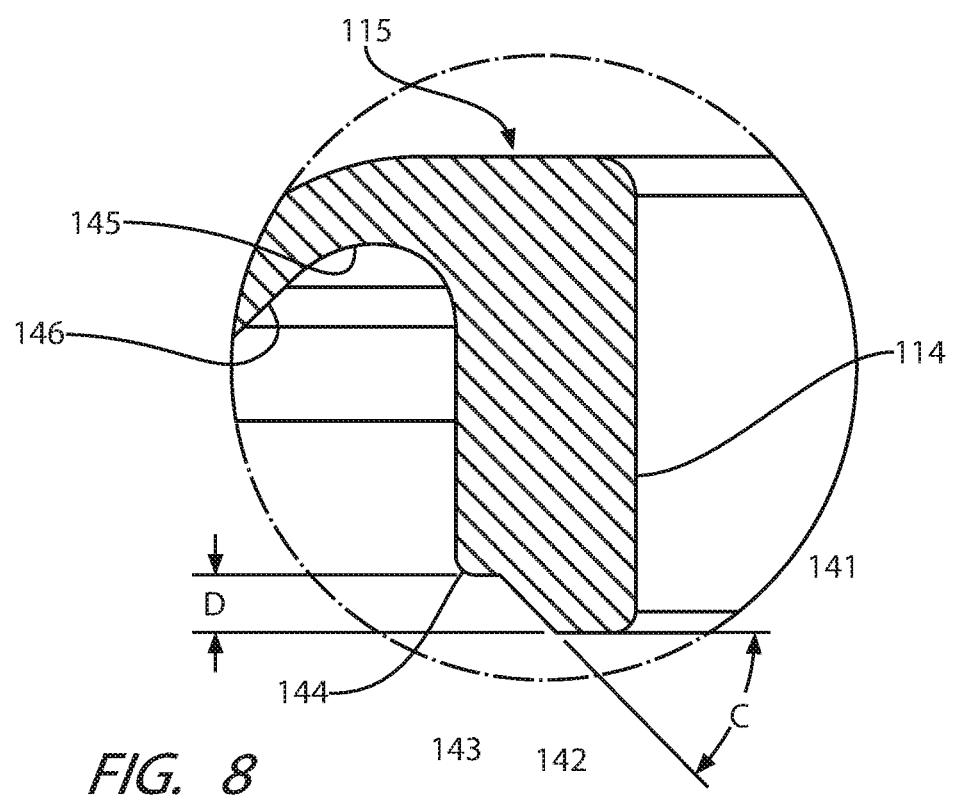
FIG. 8 is a detail view taken from area 8-8 of FIG. 3.

FIGS. 2, 3 and 8 show a gear hub blank 110. As shown, the gear hub blank 110 includes an outer circumferential edge 111, having a diameter defined by a plurality of bent tabs (or tangs) 112, extending radially outward from a center axis "X". Gear hub blank 110 also includes an inner circumferential edge 114. A body portion 115 of hub 110 extends between outer circumferential edge 111 and inner circumferential edge 114.

Figure 5:
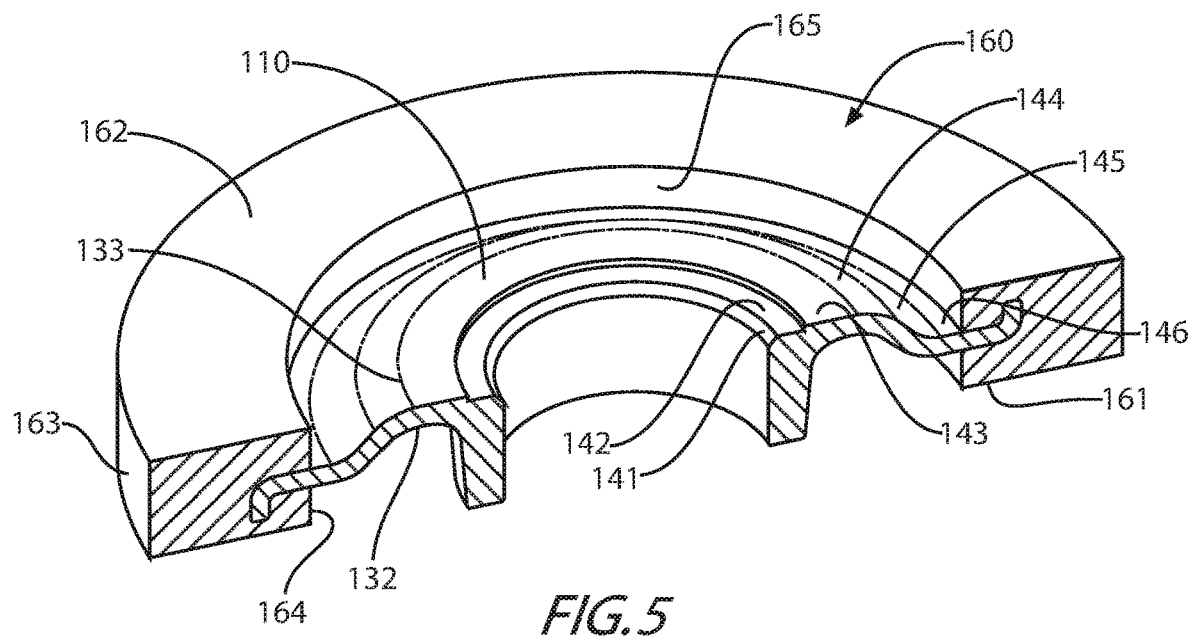
FIG. 5 is a pictorial view, partially in cross-section, taken generally along line 5-5 of FIG. 4.

As best seen in FIGS. 2, 3 and 5, an opposite inner face 132 and an opposite outer face 133 of gear hub blank 110 are generally non-symmetrical on body portion 115, which comprises a series of concentric ring corrugations 141, 142, 143, 144, 145 and 146 falling into a plurality of planes, and arranged about center axis "X". Among other advantages, concentric ring corrugations 141-146 provide added rigidity to gear hub blank 110. It will be appreciated by a person of skill in the art that the number, size and radial width of corrugations may vary depending on design torque forces and/or the gear hub blank material.

In an exemplary embodiment, gear hub blank 110 is a cold formed metal incorporating opposing bent tabs 112 extending from an outer perimeter 151 of gear hub blank 110, and in a further embodiment is made from SAE grade 1015 steel. Outer perimeter 151 also has a diameter, the outer perimeter 151 diameter being less than the diameter of outer circumferential edge 111. The gear hub blank 110 can be formed from metal utilizing a variety of stamping, spin forming, flow forming and machining techniques as required for producing the desired geometry.

Referring again to FIGS. 2 and 3, bent tabs 112 of gear hub blank 110 are shown in detail. In the exemplary embodiment shown in FIG. 2, there are eighteen separate bent tabs 112 extending from outer perimeter 151 and ending at outer circumferential edge 111 of gear hub blank 110.

In the non-limiting embodiment shown, each bent tab 112 spans an arc "A" that in the embodiment shown is an 18 degree arc. The spacing between adjacent bent tabs 112, identified as "B" has a 2 degree arc. It will be appreciated that other numbers of bent tabs 112 may be used on gear hub blank 110. Further, it will be appreciated that the span of arc "A" may be non-uniform or may vary between adjacent bent tabs 112, as may the spacing between adjacent bent tabs 112, identified as "B", depending on size and torque requirements for gear hub blank 110. Further, as specifically seen in FIG. 8, the geometry of gear hub blank 110 includes an angle "C" of about 45 degrees at the inner circumferential edge 114 and extending radially outwardly. This angle extends about half of the thickness "D" of inner circumferential edge, and in an exemplary embodiment is about 1.5 millimeters. This geometry facilitates pressing the gear hub blank 110 onto a shaft, as will be described herein.

As shown, bent tabs 112 are generally orthogonal to inner face 132 and outer face 133 of gear hub blank 110 and extend axially from face 133. Adjacent bent tabs 112 extend in opposing axial directions, such that they are about 180 degrees opposed. Of course, depending on torque requirements, other configurations for bent tabs 112 may be contemplated, including a configuration in which bent tabs simultaneously extend radially from the center "X" of hub blank 110 and also extend at an acute angle from inner face 132 and outer face 133. For example, it will be appreciated that bent tabs 112 may extend from each of faces 132 and 133 at an angle from about 45 degrees to about 90 degrees—with the example angle of 90 degrees shown. Further, one skilled in the art will recognize that the adjacent bent tabs 112 described and shown herein as alternating in opposite directions may, instead, take on a different geometric order such that pairs may extend in the same direction or pairs extend from the same face, but at differing angles.

Figure 4:
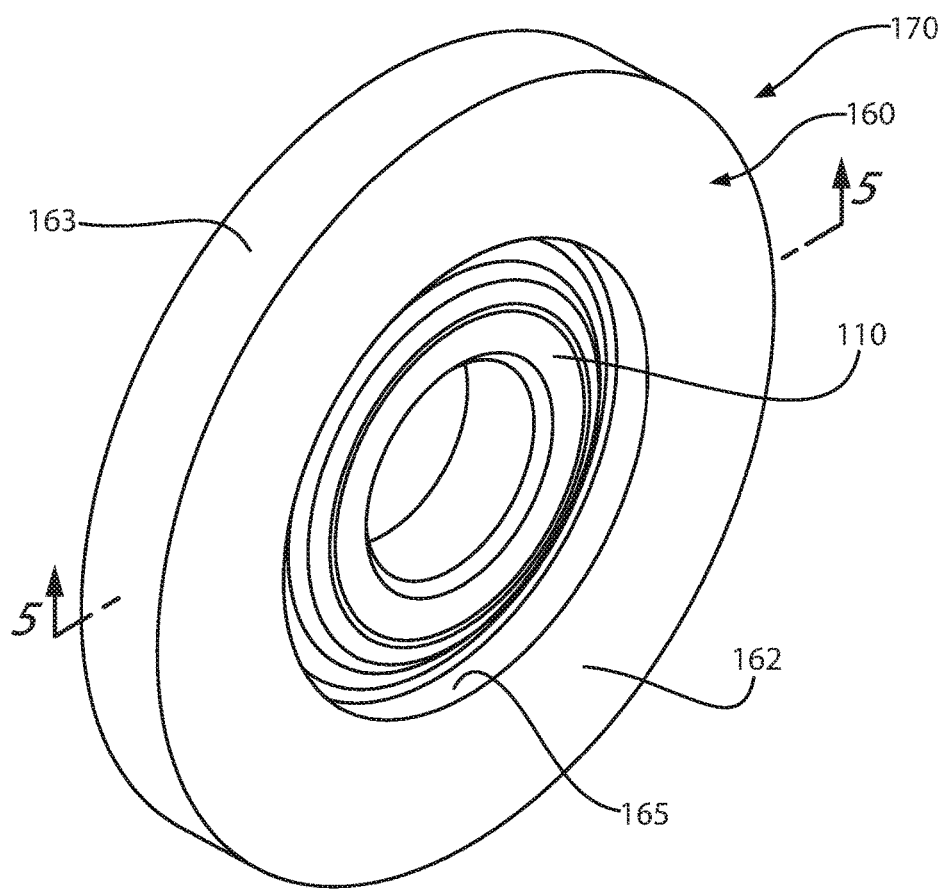
FIG. 4. is a pictorial view showing another aspect of the invention.

Referring now to FIGS. 4 and 5, a polymeric ring 160 is placed on gear hub blank 110 to form a gear blank 170. The polymeric ring 160 includes an inner ring face 161, outer ring face 162, an outer edge surface 163 and partial edge surfaces 164 and 165. As seen partial edge surface 164 extends generally orthogonally from opposite inner face 132 of gear hub blank 110, while partial edge surface 165 extends generally orthogonally from opposite outer face 133 of gear hub blank 110. Outer edge surface 163 has an outer diameter greater than the diameter of outer circumferential edge 111, while partial edge surfaces 164 and 165 have an inner diameter less than the diameter of outer perimeter 151. The bent tabs 112 of gear hub blank 110 are covered by the polymeric ring 160, and encased therein. In an exemplary embodiment, polymeric ring 160 is injection molded onto gear hub blank 110, made possible by the bent tabs 112. The polymeric ring 160 is injection molded in a generally rectangular cross-section, as seen in FIG. 5, forming a generally toroid shape, completing the gear blank 170 as seen in FIG. 4.

Figure 6:
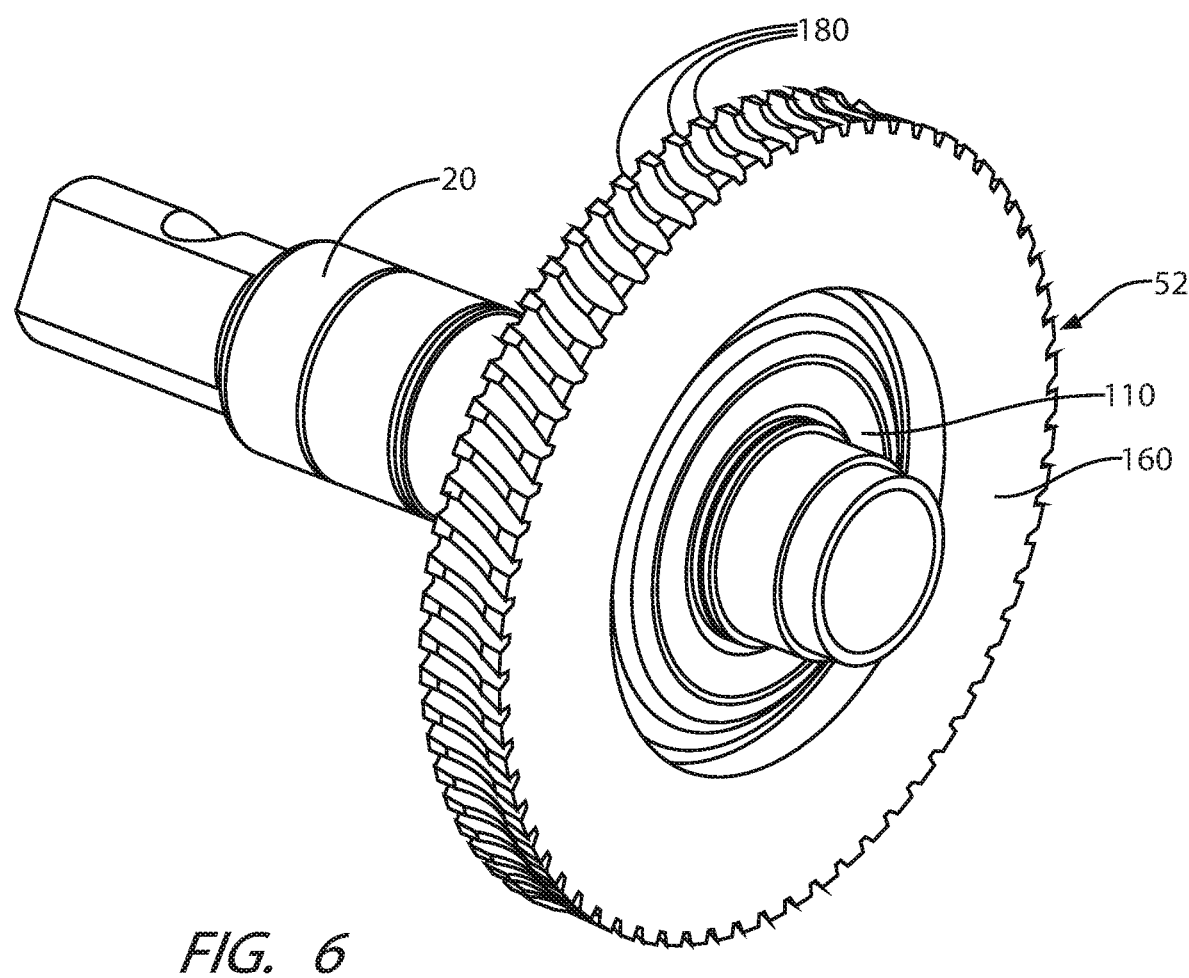
FIG. 6 is a pictorial view of a finished worm gear in accordance with one aspect of the invention.
Figure 7:
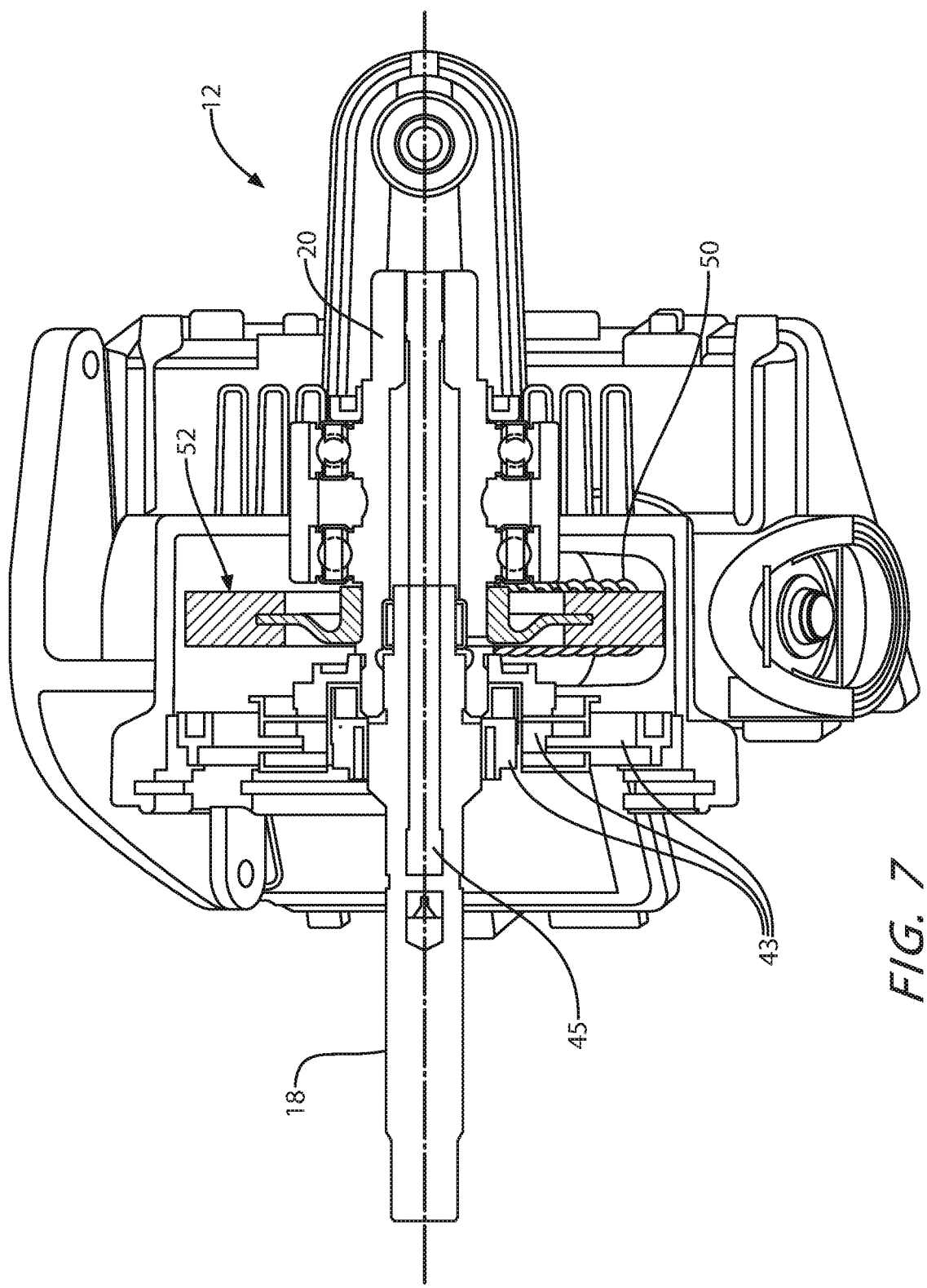
FIG. 7 is an elevation view, partially in cross-section showing another aspect of the invention.

Thereafter, gear blank 170 is pressed or welded onto a shaft, and in the example shown, lower steering shaft 20. The pressing step is followed by a hobbing process that cuts multiple individual gear teeth 180 into the outer edge surface 163 of polymeric ring 160 of gear blank 170. The result is the worm gear 52, shown in FIG. 6 placed within the steering mechanism 12 of FIG. 7. As illustrated, FIG. 7 shows lower steering shaft 20 and torque sensor 43 connected to torsion bar 45. Worm gear 52, shown in cross-section, is pressed on lower steering shaft 20 and driven by the worm 50 which is in turn driven by electric motor 34 (shown in FIG. 1).

Bent tabs 112 of gear hub blank 110 provide both axial and radial retention of the polymeric material comprising polymeric ring 160 over gear hub blank 110. In addition, the thickness of the base stock from gear hub blank 110 in bent tabs 112 provides the ability to transfer torque from one shaft to another, once gear teeth 180 have been cut in the gear blank 170. In the non-limiting embodiment shown, the bent tabs 112 of worm gear 52 carry torsional stiffness between lower shaft 20 and worm 50, allowing EPS system 10 to reliably perform at a significant cost reduction.

Figure 9:
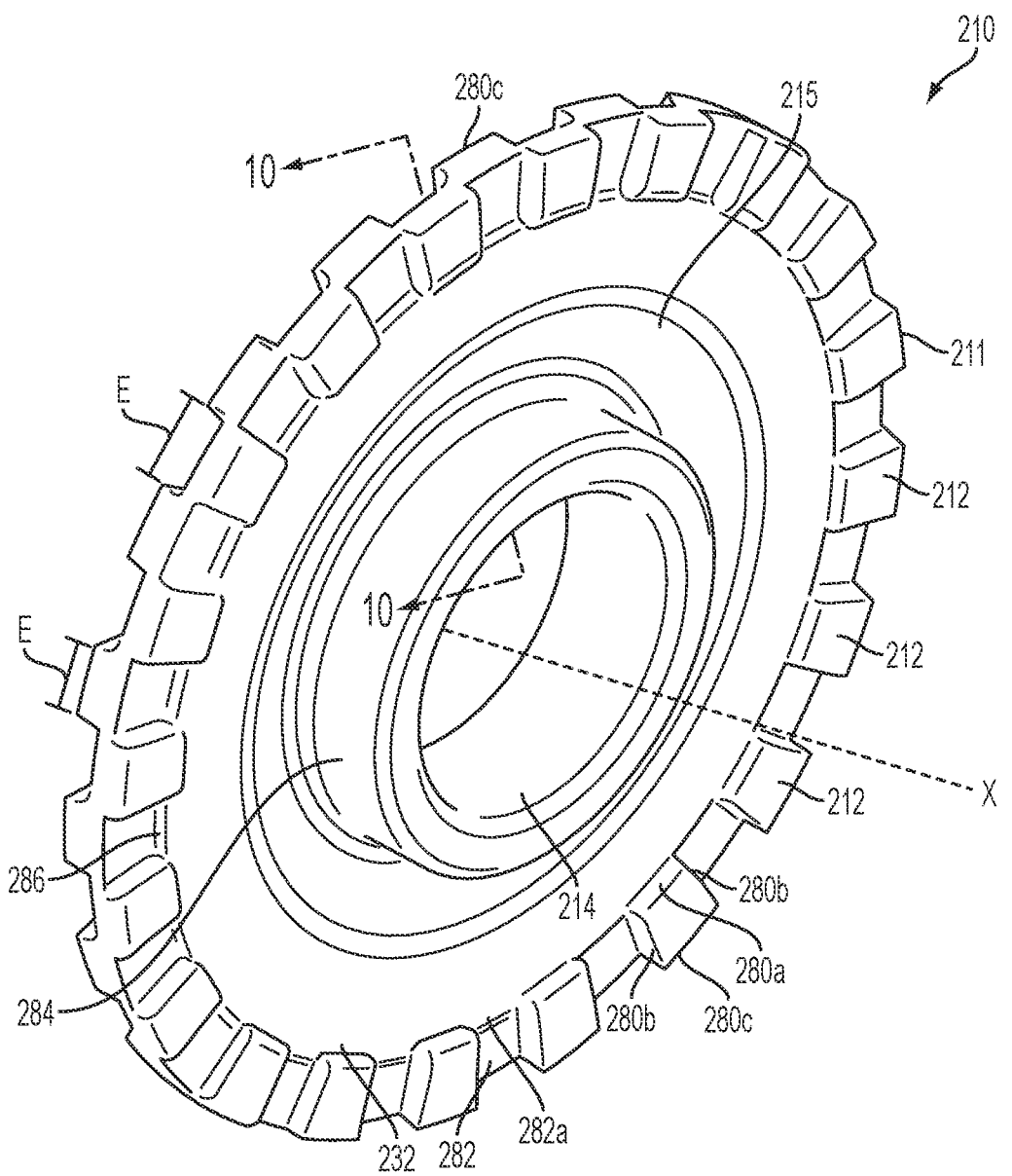
FIG. 9 is an pictorial view of a gear hub blank in accordance with an alternative embodiment of the invention.
Figure 10:
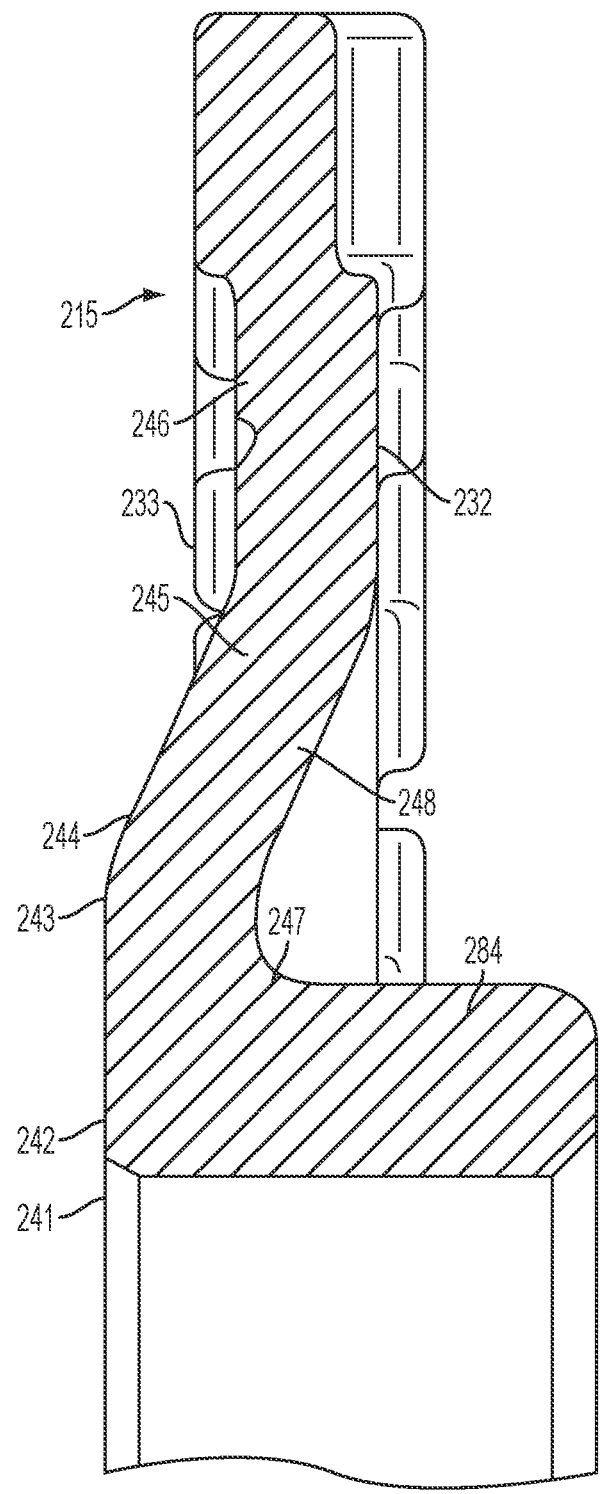
FIG. 10 is a cross-sectional view of the gear hub blank of FIG. 9 taken along line 10-10 of FIG. 9.
Figure 11:
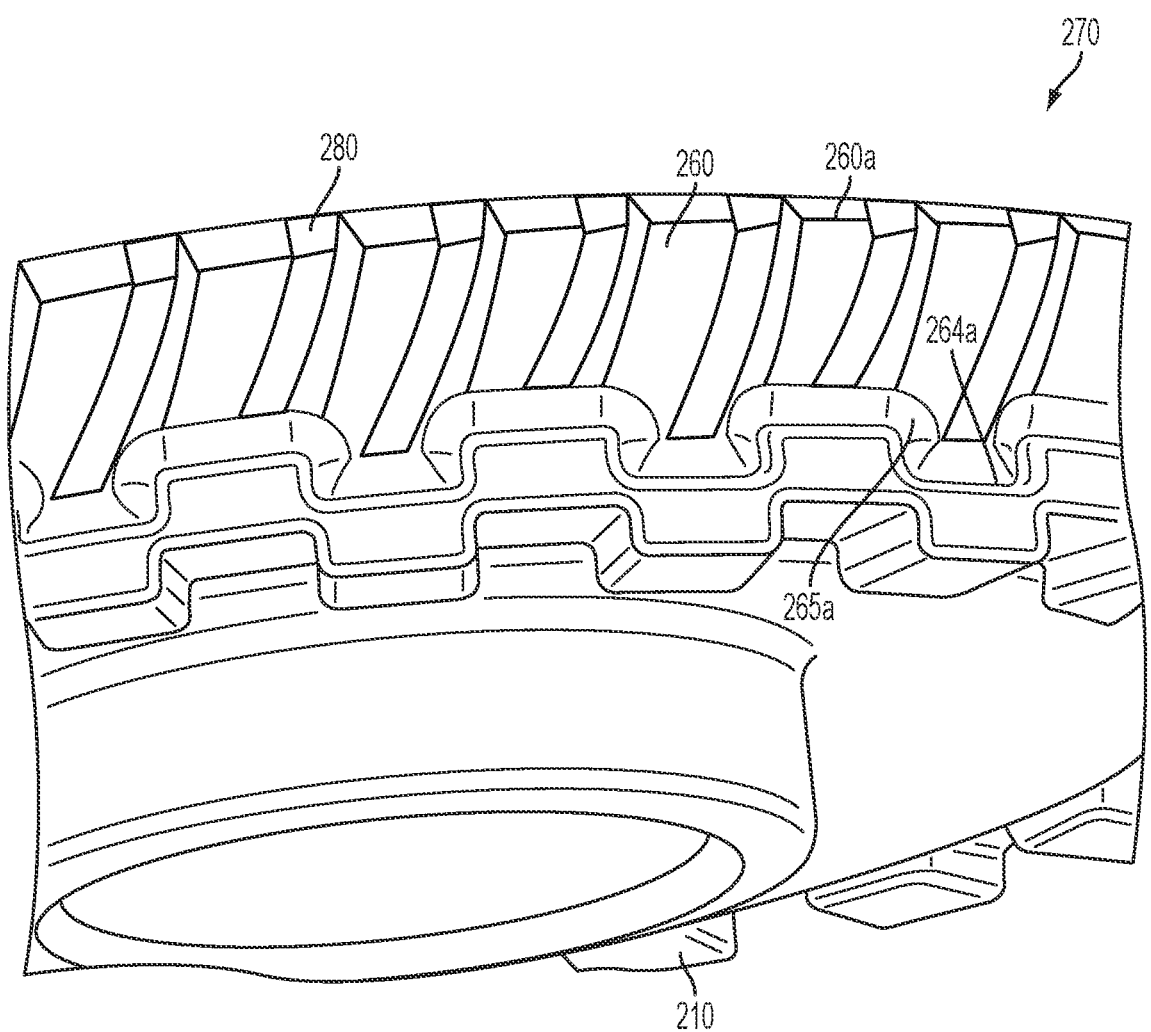
FIG. 11 is a pictorial view showing another aspect of the invention.

FIGS. 9, 10 and 11 show an alternative embodiment of a gear hub blank that may be used in applications where gear hub blank 110 may otherwise be used. As shown, the gear blank hub 210 is generally a disk shape and includes an outer circumferential edge 211, having a diameter defined by a plurality of individual lugs 212, extending radially outward from a center axis "X". Gear hub blank 210 also includes an inner circumferential edge 214. A body portion 215 of gear hub blank 210 extends between outer circumferential edge 211 and inner circumferential edge 214.

As best seen in FIG. 10 hub portion 284 provides a concentric opening and an interface for a shaft to transmit torque to lugs 212. In certain embodiments, the hub portion 284 is of thicker construction compared to other portions of gear hub blank 210 to maintain hoop strength. An opposite inner face 232 and an opposite outer face 233 of gear hub blank 210 are generally non-symmetrical on body portion 215, which comprises a series of concentric ring corrugations 241, 242, 243, 244, 245, 246, 247, and 248 falling into a plurality of planes, and arranged about center axis "X". Among other advantages, hub portion 284 and concentric ring corrugations 241-248 provide added rigidity to gear hub blank 210. It will be appreciated by a person of skill in the art that the number, size and radial width of hub portion 284 and corrugations 241-248 may vary depending on design torque forces and/or the gear hub blank material.

In an exemplary embodiment, gear hub blank 210 is a cold formed metal, and in a further embodiment is made from SAE grade 1015 steel. The gear hub blank 210 can be formed from metal utilizing a variety of pressed powdered metal forming, stamping, spin forming, flow forming and machining techniques as required for producing the desired geometry.

Referring again to FIGS. 9 and 10, lugs 212 of gear hub blank 210 are shown in detail. In the exemplary embodiment shown in FIG. 2, there are twenty separate lugs 212 on inner face 232 extending from a retaining inner lug diameter 286 and ending adjacent to outer circumferential edge 211 of gear hub blank 210. Similarly, in an exemplary embodiment, there are twenty separate lugs 212 on outer face 233, offset from the lugs on inner face 232, extending from retaining inner lug diameter 286 and ending adjacent to outer circumferential edge 211 of gear hub blank 210. In an exemplary embodiment, adjacent lugs 212 are formed on opposite inner face 232 and outer face 233.

In the non-limiting embodiment shown, each lug 212 spans an arc "E" that in the embodiment shown is an approximately 8.75 degree arc. Circumferentially adjacent lugs 212 formed on each inner face 232 and outer face 233 are spaced apart by cavities 282 formed by the raised portions of lugs 212 and inner face 232 and outer face 233. Similarly, each cavity may span an arc "E" in the embodiment shown as an approximately 8.75 degree arc. It will be appreciated that other numbers of lugs 212 and cavities 282 may be used on gear hub blank 210. Further, it will be appreciated that the span of arc "E" may be non-uniform or may vary between circumferentially adjacent lugs 212 on each inner face 232 and outer face 233, as may the spacing between circumferentially adjacent lugs 212 on each inner face 232 and outer face 233, and the span of cavities 282, depending on size and torque requirements for gear hub blank 210.

In an exemplary embodiment, the lugs 212 of face 232 are rotationally offset from the lugs 212 of face 233. In an exemplary embodiment, the lugs 212 of face 233 are offset by arc "E", causing each lug 212 to be opposite a cavity 282 on the opposite face. In other embodiments, the offset may be any other amount. In certain embodiments lugs 212 of opposite faces may have overlap.

As shown, lugs 212 are protrusions generally orthogonal to inner face 232 and outer face 233 of gear hub blank 210. Lugs 212 extend radially from a retaining inner lug diameter 286 to an outer circumferential edge 211. Each lug 212 has a raised inner edge 280a formed circumferentially about retaining inner lug diameter 286. Raised inner edge 280a is raised above inner face 232 or outer face 233. Similarly, each lug has two lateral edges 280b radially extending from a retaining inner lug diameter 286 to an outer circumferential edge 211. Lateral edges 280b are raised above inner face 232 or outer face 233 and cavities 282. Lugs 212 terminate at outer circumferential edge 211 with a lug outer edge 280c.

Similarly, in between circumferentially adjacent lugs 212, cavities 282 may be formed therebetween. Cavity 282 is generally recessed compared to lugs 212 and inner face 232 and outer face 233. Cavities 282 are generally formed by the raised lateral edges 280b, 280c of circumferentially adjacent lugs 212. Inner cavity edge 282a is formed along retaining inner lug diameter 286 and terminates at outer circumferential edge 211.

Of course, depending on torque requirements, other configurations for lugs 212 may be contemplated. Further, one skilled in the art will recognize that the adjacent lugs 212 described and shown herein as alternating in opposite directions may, instead, take on a different geometric order such that lugs 212 are only formed from the same face or formed in an alternative pattern.

Similar to gear hub blank 110, a polymeric ring 160 may be placed on gear hub blank 210 to form a gear blank 170. Referring to FIG. 11, the use of lugs 212 and cavities 282 allows for advantageous flow characteristics during formation of polymeric ring 160. As the polymeric flow 260a flows around gear hub blank 210, the polymeric flow 260a does not experience any flow restrictions or obstructions that may otherwise slow down polymeric flow 260a. Accordingly, polymeric flow 260a flows around gear hub blank 260a and flow edges 264a, 265a in a uniform manner, allowing polymeric flow 260a to join around gear hub blank 210 and cool in a uniform manner. The uniform flow behavior of polymeric flow 260a reduces the occurrence of "flow" and "knit" lines wherein polymeric flow 260a of different temperatures and different consistencies would previously come together. Such a uniform flow behavior of polymeric flow 260a allows for increased strength and dimensional stability of polymeric ring 160 and gear blank 170.

In an exemplary embodiment, lugs 212 of gear hub blank 210 provide retention of the polymeric material comprising polymeric ring 160 over gear hub blank 210. Particularly, the inner lug edge 280a along retaining inner lug diameter 286 allows for radial and axial retention of polymeric ring 160. Similarly, lateral edges 280b allow for torsional retention of polymeric ring 160. Accordingly, the use of lugs 212 allows for a high level of torque transmission compared to conventional designs.

In addition, the thickness of the base stock from gear hub blank 210, particularly in hub portion 284 provides the ability to transfer torque from one shaft to another, once gear teeth 180 have been cut in the gear blank 170. In the non-limiting embodiment shown, the lugs 212 of worm gear 52 carry torsional stiffness between lower shaft 20 and worm 50, allowing EPS system 10 to reliably perform at a significant cost reduction by allowing the use of less material in gear blank hub 210, an overall smaller diameter and lighter part weight.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed as the best mode contemplated for carrying out this invention, but that the invention will include all embodiments falling within the scope of the present application.

What is claimed is:

1. An electric power steering system comprising:
   a steering shaft connected to a handwheel at one end and a rack and pinion steering mechanism at an opposite end;
   a steering assist unit comprising an electric motor operated by a controller and driving a worm and a worm gear interposed between said worm and said steering shaft, said worm having worm teeth and said worm gear fitted on said steering shaft;
   said worm gear further comprising:
      a disk having a first face axially disposed opposite a second face;
      a first plurality of individual lugs formed on said first face circumferentially adjacent an outer circumferential edge of said disk, the outer circumferential edge being a continuous and seamless edge having a constant diameter, wherein each lug of said first plurality of individual lugs having a lug inner edge formed on said first face along a first retaining diameter, said first retaining diameter less than a disk diameter, circumferentially adjacent lugs of said first plurality of individual lugs having a first circumferential spacing therebetween, each of the first plurality of individual lugs having a pair of lug lateral edges, a lug outer edge and the lug inner edge, wherein the raised lateral edges protrude axially away from the first face and the second face;
      a ring overlaying a portion of said disk including said first plurality of individual lugs, said ring having an outer diameter, said outer diameter greater than said disk diameter; and
      a plurality of gear teeth on an outer edge surface of said ring for meshing with said worm teeth.

2. The electric power steering system of claim 1, further comprising:
   a second plurality of individual lugs formed on said second face circumferentially adjacent said outer circumferential edge of said disk and opposite and offset from the first plurality of individual lugs, wherein each lug of said second plurality of individual lugs having a second lug inner edge formed on said second face along a second retaining diameter, said second retaining diameter less than said disk diameter, circumferentially adjacent lugs of said second plurality of individual lugs having a second circumferential spacing therebetween.

3. The electric power steering system of claim 1, wherein said worm gear is formed by at least one process of a group consisting of: stamping, hot forging, cold forging, spin forming, flow forming, machining, and pressing powdered metal.

4. The electric power steering system of claim 1, wherein said ring is polymeric.

5. The electric power steering system of claim 1, wherein said disk includes a concentric opening therethrough.

6. The electric power steering system of claim 5, wherein a hub portion adjacent to said concentric opening is thicker than said first and second face.

7. An electric power steering system comprising:
   a steering shaft connected to a handwheel at one end and a rack and pinion steering mechanism at an opposite end;
   a steering assist unit comprising an electric motor operated by a controller and driving a worm and a worm gear interposed between said worm and said steering shaft, said worm having worm teeth and said worm gear fitted on said steering shaft;
   said worm gear further comprising:
      a single, integrally formed disk having a first face axially disposed opposite a second face;
      a first plurality of individual lugs integrally formed on said first face circumferentially adjacent an outer circumferential edge of said disk, the outer circumferential edge being a continuous and seamless edge having a constant diameter, wherein each lug of said first plurality of individual lugs having a first inner circumferential edge formed on said first face along a first retaining diameter, said first retaining diameter less than a disk diameter, circumferentially adjacent lugs of said first plurality of individual lugs having a first circumferential spacing therebetween;
      a ring overlaying a portion of said disk including said first plurality of individual lugs, said ring having an outer diameter, said outer diameter greater than said disk diameter; and
      a second plurality of individual lugs formed on said second face circumferentially adjacent said outer circumferential edge of said disk and opposite and offset from the first plurality of individual lugs, wherein each lug of said second plurality of individual lugs having a second inner circumferential edge formed on said second face along a second retaining diameter, said second retaining diameter less than said disk diameter, circumferentially adjacent lugs of said second plurality of individual lugs having a second circumferential spacing therebetween, wherein each of the first plurality of individual lugs do not circumferentially overlap with any of the second plurality of individual lugs; and
      a plurality of gear teeth on an outer edge surface of said ring for meshing with said worm teeth.

* * * * *